US008666663B2

(12) United States Patent
Kudo

(10) Patent No.: US 8,666,663 B2
(45) Date of Patent: Mar. 4, 2014

(54) ROUTE SEARCH DEVICE AND ROUTE SEARCH METHOD

(75) Inventor: Takefumi Kudo, Isehara (JP)

(73) Assignee: Clarion Co., Ltd., Tokyo (JP)

( * ) Notice: Subject to any disclaimer, the term of this patent is extended or adjusted under 35 U.S.C. 154(b) by 19 days.

(21) Appl. No.: 13/376,504

(22) PCT Filed: Jun. 1, 2010

(86) PCT No.: PCT/JP2010/059283
§ 371 (c)(1),
(2), (4) Date: Dec. 6, 2011

(87) PCT Pub. No.: WO2010/143562
PCT Pub. Date: Dec. 16, 2010

(65) Prior Publication Data

US 2012/0101728 A1    Apr. 26, 2012

(30) Foreign Application Priority Data

Jun. 8, 2009  (JP) ................................. 2009-137716

(51) Int. Cl.
*G06F 19/00* (2011.01)

(52) U.S. Cl.
USPC ........... 701/540; 701/410; 701/414; 701/415; 701/418; 701/421; 340/990; 340/995.2; 340/995.19; 340/995.21; 707/769; 709/245; 386/241

(58) Field of Classification Search
USPC ........... 701/66, 410, 414, 415, 418, 421, 423, 701/424, 425, 427, 428, 439, 443, 442, 455, 701/465, 468, 494, 524, 532, 533, 540; 340/990, 995.2, 995.15, 995.23, 340/995.25; 707/769; 709/245; 386/241
See application file for complete search history.

(56) References Cited

U.S. PATENT DOCUMENTS

| 4,862,496 | A * | 8/1989 | Kelly et al. ............... 379/221.01 |
| 6,418,373 | B1 | 7/2002 | Omi et al. |
| 7,412,326 | B2 * | 8/2008 | Yoshioka et al. .............. 701/459 |
| 7,546,205 | B2 * | 6/2009 | Sumizawa et al. ............ 701/533 |
| 8,452,534 | B2 * | 5/2013 | Kudo ............................ 701/430 |
| 2001/0004725 | A1 | 6/2001 | Yagyu |
| 2002/0111736 | A1 | 8/2002 | Chowanic et al. |
| 2002/0152025 | A1 | 10/2002 | Shimada |

(Continued)

FOREIGN PATENT DOCUMENTS

| JP | 10-281784 | 10/1998 |
| JP | 2001-124578 | 5/2001 |

(Continued)

OTHER PUBLICATIONS

International Search Report dated Aug. 31, 2010 issued in PCT/JP2010/059283.

(Continued)

*Primary Examiner* — McDieunel Marc
(74) *Attorney, Agent, or Firm* — Scully, Scott, Murphy & Presser, P.C.

(57) ABSTRACT

A technology for searching for a recommended route matched to a search condition is provided for route search that involves substitution with a learned route. A route search device comprises: a storage unit to store therein, as learned routes, routes corresponding to sections where traveling deviated from recommended routes have been performed; a setting unit to set a search condition matched a recommended route; a recommended-route search unit to find a recommended route on the basis of the search condition; an application unit to select any one of the learned routes that is applicable to the thus found recommended route, and apply the selected learned route to the recommended route; and a display unit to display the recommended route to which the learned route has been applied. The storage unit stores therein category information of the learned routes in association with the respective learned routes. The application unit selects, from the storage unit, any one of the learned routes that is associated with the category information matched to the search condition.

8 Claims, 9 Drawing Sheets

(56) References Cited

U.S. PATENT DOCUMENTS

2004/0204846 A1   10/2004   Yano et al.
2007/0198172 A1*   8/2007   Sumizawa et al. ............ 701/201

FOREIGN PATENT DOCUMENTS

| | | |
|---|---|---|
| JP | 2001-174280 | 6/2001 |
| JP | 2002-133575 | 5/2002 |
| JP | 2002-181573 A | 6/2002 |
| JP | 2003-232645 | 8/2003 |

OTHER PUBLICATIONS

Extended Supplementary European Search Report dated Aug. 30, 2013 from related application EP 10786093.4-1557.

* cited by examiner

LEARNED ROUTE INFORMATION 400

| LEARNED ROUTE ID | LEARNED LINK ID | NUMBER OF TRAVELING TIMES | TYPE INFORMATION |
|---|---|---|---|
| * * * | **, **, **, **, **, ** | X TIMES | TOLL ROAD |
| * * * | **, **, **, **, **, ** | Y TIMES | ORDINARY ROAD |
| * * * | **, **, **, **, **, ** | Z TIMES | NARROW ROAD |
| ⋮ | ⋮ | ⋮ | ⋮ |

411　412　413　414　415

FIG. 7
(A) PRESENT INVENTION
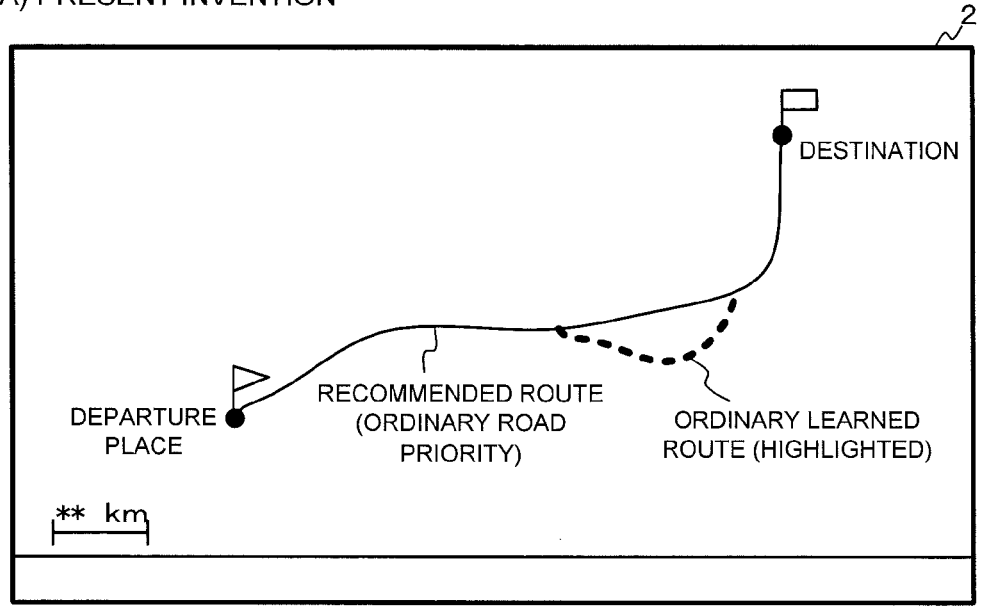
(B) LEARNED ROUTE TO BE APPLIED IS UNCHANGEABLE TO MEET
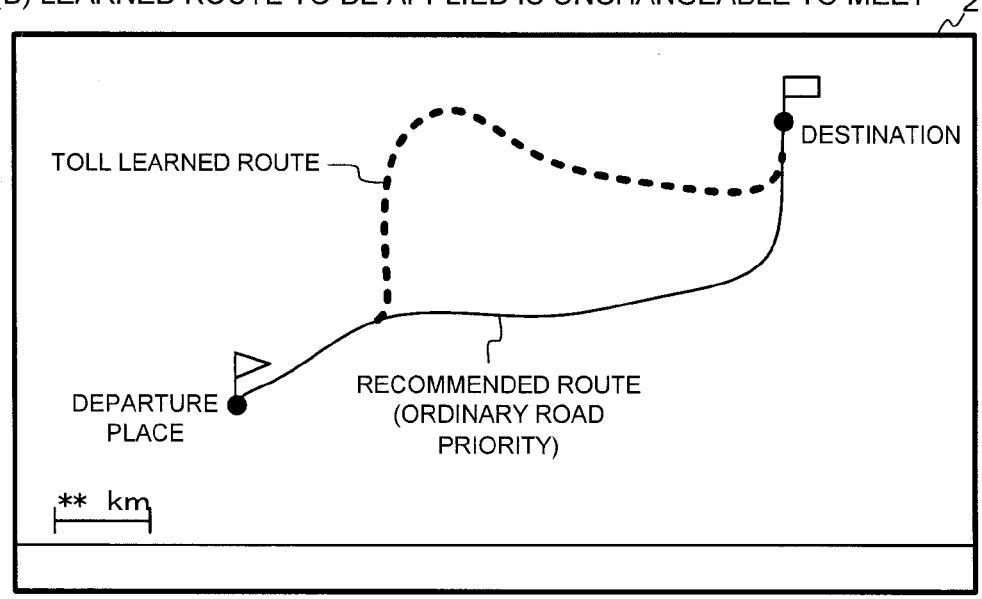

FIG. 9

| SEARCH CONDITION | LEARNED ROUTE TYPE | | | ASSESSMENT OF TRAFFIC CONGESTION |
|---|---|---|---|---|
| | TOLL LEARNED ROUTE | ORDINARY LEARNED ROUTE | NARROW LEARNED ROUTE | |
| FIRST TOLL ROAD PRIORITY | ○ | ○ | ○ | ○ |
| SECOND TOLL ROAD PRIORITY | △ LIMITED TO LEARNED ROUTE NOT USED IN THE FIRST TOLL ROAD PRIORITY | △ ORDINARY LEARNED ROUTE IS NOT USED TO REPLACE TOLL ROAD SECTION | ○ | ○ |
| THIRD TOLL ROAD PRIORITY (FEE CONSIDERED) | × | △ ORDINARY LEARNED ROUTE IS NOT USED TO REPLACE TOLL ROAD SECTION | ○ | ○ |
| FIRST ORDINARY ROAD PRIORITY | × | ○ | ○ | ○ |
| SECOND ORDINARY ROAD PRIORITY (WIDTH PRIORITY) | × | △ LIMITED TO LEARNED ROUTE NOT USED IN THE FIRST ORDINARY ROAD PRIORITY | × | × |
| DISTANCE PRIORITY | × | × | × | × |

FIG. 10
(A) PRESENT INVENTION
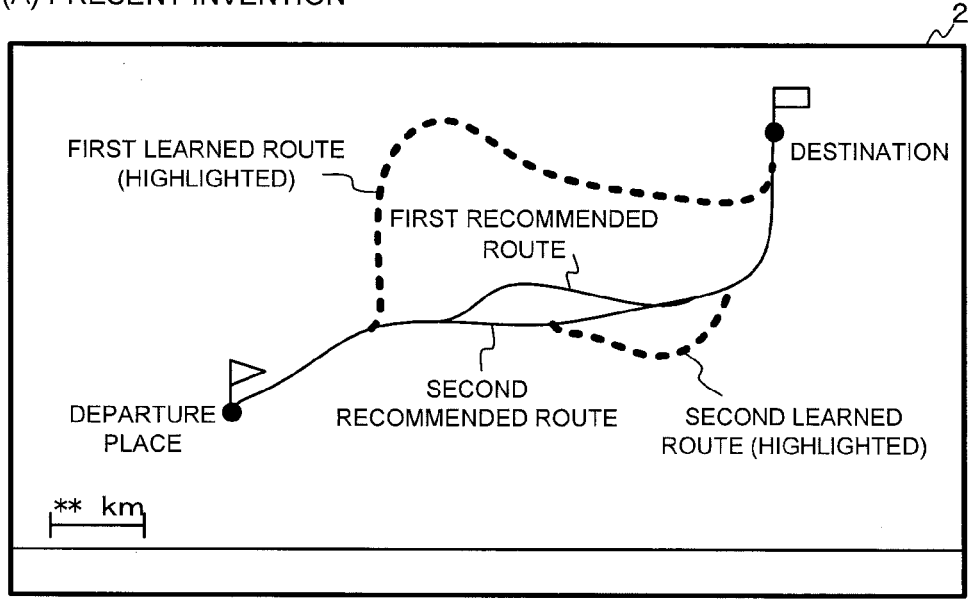
(B) LEARNED ROUTE TO BE APPLIED IS UNCHANGEABLE TO MEET
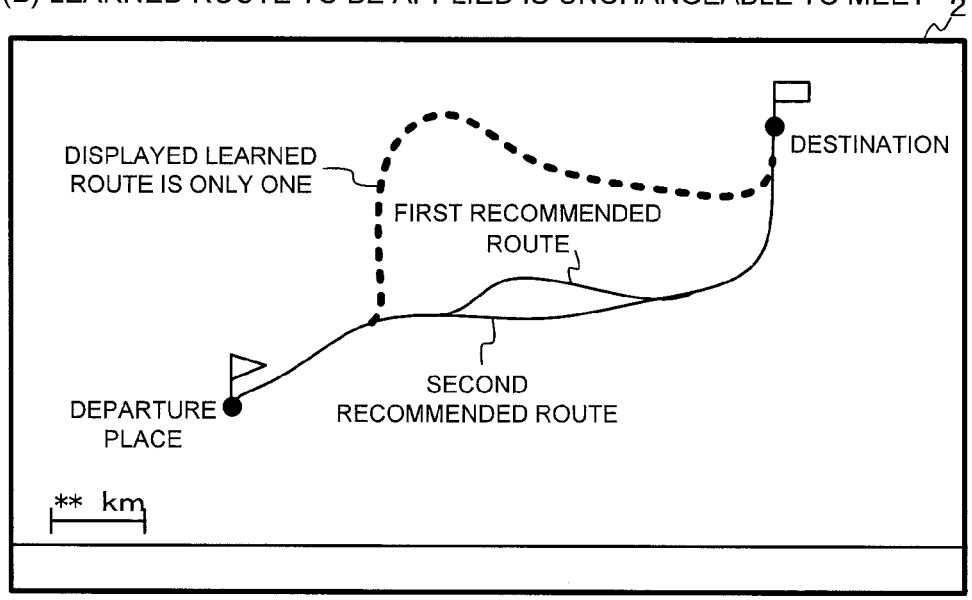

ROUTE SEARCH DEVICE AND ROUTE SEARCH METHOD

TECHNICAL FIELD

The present invention relates to a route search device and a route search method.

BACKGROUND ART

There is a navigation system which registers as a learned route, a route of a section through which traveling is performed with deviation from a recommended route (for example, see Patent Document 1). In this kind of navigation system, the recommended route obtained by a route search is partially replaced by the learned route.

PRIOR ART DOCUMENT

Patent Document

[Patent Document 1] Japanese Unexamined Patent Application Publication No. 2001-174280

DISCLOSURE OF THE INVENTION

Problem to be Solved by the Invention

By the way, in the navigation system described above, there is no distinction among route types (toll road, ordinary road, narrow road, and the like) of the learned route. Therefore, even in the case where a route search limiting a target to an ordinary road is requested, there is a possibility the learned route employs a route including a toll road. This may result in that a retrieved recommended route does not meet a search condition designated by a user.

An object of the present invention is to provide a technique for retrieving a recommended route that meets a search condition, in the route search which performs replacement by a learned route.

Means to Solve the Problem

The present invention for solving the problem as described above is directed to a route search device such as a navigation system, including a storage unit adapted to store as a learned route, a route of a section through which travelling is performed with deviation from a recommended route, a setting unit adapted to set a search condition of the recommended route, a recommended route searching unit adapted to search for the recommended route based on the search condition, an application unit adapted to select from the storage unit, a learned route applicable to the recommended route being retrieved and applying the learned route to the recommended route, and a display unit adapted to display the recommended route to which the learned route is applied, wherein, the storage unit stores type information of the learned route, together with the learned route, and the application unit selects from the storage unit, a learned route having the type information that meets the search condition.

The storage unit stores the learned route, the type information, and an order of priority of the learned route, establishing associations with one another, and the application unit selects from the storage unit, a learned route based on the order of priority, out of the learned routes having the type information that meets the search condition.

BRIEF DESCRIPTION OF DRAWINGS

FIG. 7(A) illustrates a display example of a recommended route according to the present invention, and FIG. 7(B) illustrates a display example of the recommended route in the case where there is no applicable learned route that meets the search condition;

FIG. 9 illustrates an example of associations between the search condition and the type information of the learned route; and FIG. 10(A) illustrates a display example of the recommended routes being retrieved by multiple route searching according to the present invention, and FIG. 10(B) illustrates a display example of the recommended routes being retrieved by the multiple route searching, in the case where there is no applicable learned route that meets the search condition.

BEST MODE FOR CARRYING OUT THE INVENTION

Hereinafter, one embodiment of the present invention will be explained with reference to the accompanying drawings.

Figure 1:
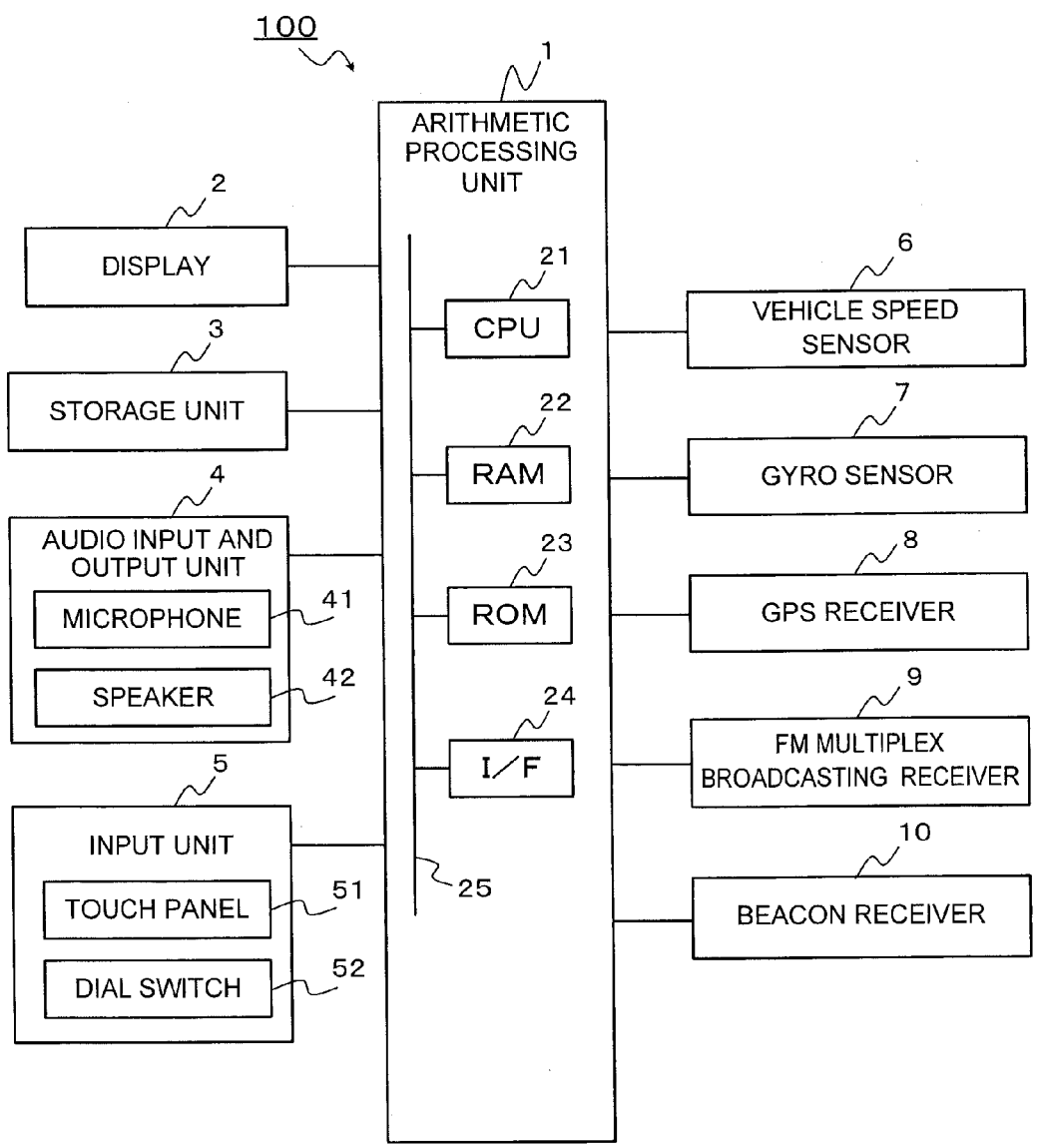
FIG. 1 is a schematic block diagram of a navigation system to which one embodiment of the present invention is applied.

FIG. 1 is a schematic block diagram of the navigation system 100 to which one embodiment of the present invention is applied. As illustrated, the navigation system 100 is provided with the arithmetic processing unit 1, a display 2, a storage unit 3, an audio input and output unit 4 (a microphone 41 and a speaker 42), an input unit 5 (a touch panel 51 and a dial switch 52), a vehicle speed sensor 6, a gyro sensor 7, a GPS receiver 8, an FM multiplex broadcasting receiver 9, and beacon receiver 10. The navigation system 100 may be a car navigation system mounted on a vehicle, or a portable terminal such as a mobile phone and a PDA.

The arithmetic processing unit 1 is a main unit for performing various processing. By wav of example, the arithmetic processing unit 1 includes a CPU (Central Processing Unit) 21 for executing various processing such as numerical processing and a control of each device, RAM (Random Access Memory) 22 for storing map data and operation data being read from the storage unit 3, ROM (Read Only Memory) 23 for storing programs and data, an I/F (interface) 24 for establishing connection between the arithmetic processing unit 1 and various hardware. Then, the arithmetic processing unit 1 has a configuration that one device is connected to another mutually via a bus 25. Functional parts (101 to 107) described below are implemented by executing programs which the CPU 21 reads into a memory such as the RAM 22.

By way of example, the arithmetic processing unit 1 detects a current position based on information outputted from various sensors (6, 7) and from the GPS receiver 8. On the basis of the current position being obtained, the arithmetic processing unit 1 reads out from the storage unit 3, map data necessary to create a display. Furthermore, the arithmetic processing unit 1 graphically expands the map data being read out, and displays the data on the display 2 in such a manner as superimposing thereon a current position mark (or a moving object mark representing a position of the moving object). The arithmetic processing unit 1 uses the map data stored in the storage unit 3 to retrieve an optimum route (hereinafter, referred to as a "recommended route") connecting a departure place (current position) with a destination designated by the user. It further uses the speaker 42 of the audio input and output unit 4 and the display 2 to guide the user.

The display 2 is a unit for displaying the graphics information generated by the arithmetic processing unit 1. The display 2 is made up of a liquid crystal display or an organic EL (Electro-Luminescence) display.

The storage unit 3 is made up of a storage medium such as a CD-ROM, a DVD-ROM, a HDD, and an IC card. This storage medium stores map data 310, learned route information 400, audio data, video data, and the like, for instance.

Figures 2, 3:
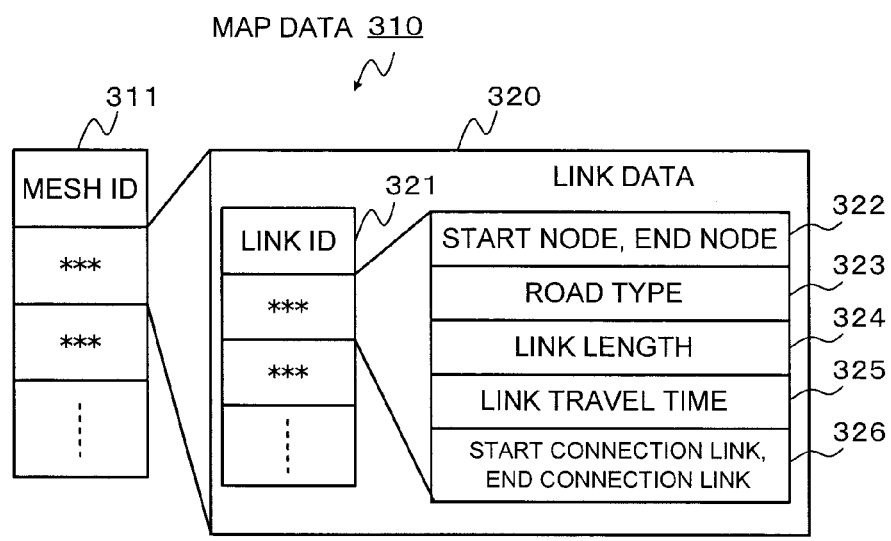
FIG. 2 illustrates a schematic data structure of map data.
FIG. 3 illustrates a schematic data structure of learned route information.

FIG. 2 illustrates a schematic data structure of map data 310. As illustrated, the map data 310 includes link data 320 with respect to each identification code (mesh ID) 311 indicating a mesh being a region partitioned on the map, the link data representing each link constituting a road included in the mesh region.

The link data 320 includes with respect to each link identification code (link ID) 321, coordinate information 322 of two nodes (a start node and an end node) constituting the link, a road type 323 indicating type information of the road including the link, link length information 324 indicating a length of the link, a link travel time 325, identification codes of links respectively connecting to the two nodes (connection link ID) 326, and the like. It is to be noted here that there is a distinction between the start node and the end node being the two nodes constituting a link, thereby allowing up-line and down-line of the road to be managed as links different from each other. It is to be noted that the road type 323 includes information such as "toll road", "ordinary road", and "narrow road". Furthermore, additional information such as a toll fee and a width of road is included in the road type 323.

FIG. 3 illustrates a schematic data structure of the learned route information 400. A route of a section through which traveling is performed with deviation from a recommended route (hereinafter, referred to as "learned route") is registered in the learned route information 400. By way of example, as illustrated, the learned route information 400 is made up of a record 415 with respect to each identification code of the learned route (learned route ID) 411. Each record 415 stores link identification code (link ID) 412 constituting the learned route, the number of traveling times through the learned route 413, and type information 414 of the learned route, in such a manner as establishing associations with one another. Here, as for the link ID 412 indicating each link constituting the learned route, the link IDs indicating links from the link of a point deviating from the recommended route (deviation point) to the link of a point returning to the recommended route (return point) are registered in the order of traveling sequence. As for the number of traveling times 413, the number of traveling times is registered, serving as a value to represent the priority of the learned route. For example, "X times" and "Y times" are registered. As for the type information 414, a character string is registered, such as "toll road", "ordinary road", and "narrow road", for instance, indicating type information of the learned route.

Here, referring to FIG. 1 again, the audio input and output unit 4 is provided with the microphone 41 as an audio input unit, and the speaker 42 as an audio output unit. The microphone 41 captures audio data from the outside of the navigation system 100, such as voice of a driver and other passengers. The speaker 42 outputs an audio signal generated by the arithmetic processing unit 1. The microphone 41 and the speaker 42 are separately mounted on predetermined portions of a vehicle.

The input unit 5 is a unit for accepting a directive from the user. The input unit 5 is made up of the touch panel 51, the dial switch 52, and other hard switches (not illustrated) such as a scroll key and a scaling key.

The touch panel 51 is an operation panel being a transparent type, to be attached on a display surface of the display 2. The touch panel 51 is used to specify a touch position in association with XY coordinates of the image displayed on the display 2, convert the touch position to coordinates, and output the coordinates. The touch panel 51 is made up of pressure-sensitive type or electrostatic type input detecting elements, or the like.

The dial switch 52 is constructed in rotatable manner, both in the clockwise direction and in the anticlockwise direction, issues a pulse signal according to a rotation by a predetermined angle, and outputs the pulse signal to the arithmetic processing unit 1. The arithmetic processing unit 1 obtains a rotation angle of the dial switch 52 based on the number of the pulse signals.

The vehicle speed sensor 5, the gyro sensor 7, and the GPS receiver 8 are used to detect a current position (location of one's own vehicle) and the like, of a moving object (the navigation system 100). The vehicle speed sensor 6 is a sensor for outputting vehicle speed data that is used to calculate a vehicle speed. The gyro sensor 7 is made up of an optical fiber gyroscope, a vibrating gyroscope, or the like, to detect an angular rate according to a rotation of the moving object. The GPS receiver 8 receives a signal from a GPS satellite, measures a distance between the moving object and the GPS satellite, and a rate of change of the distance, with respect to at least three satellites, thereby obtaining the current position and a travelling speed of the moving object.

The FM multiplex broadcasting receiver 9 receives an FM multiplex broadcasting signal that is transmitted from an FM multiplex broadcasting station. The FM multiplex broadcasting information includes brief current traffic information, information on restrictions, SA/PA (service area/parking area) information, parking lot information, weather information, and the like, according to the VICS (Vehicle Information Communication System: registered trademark), and character information and the like, provided by a radio station as FM multiplex general information.

The beacon receiver 10 receives traffic congestion information, information on restrictions, SA/PA information, parking lot information, and the like, transmitted from beacons.

Figure 4:
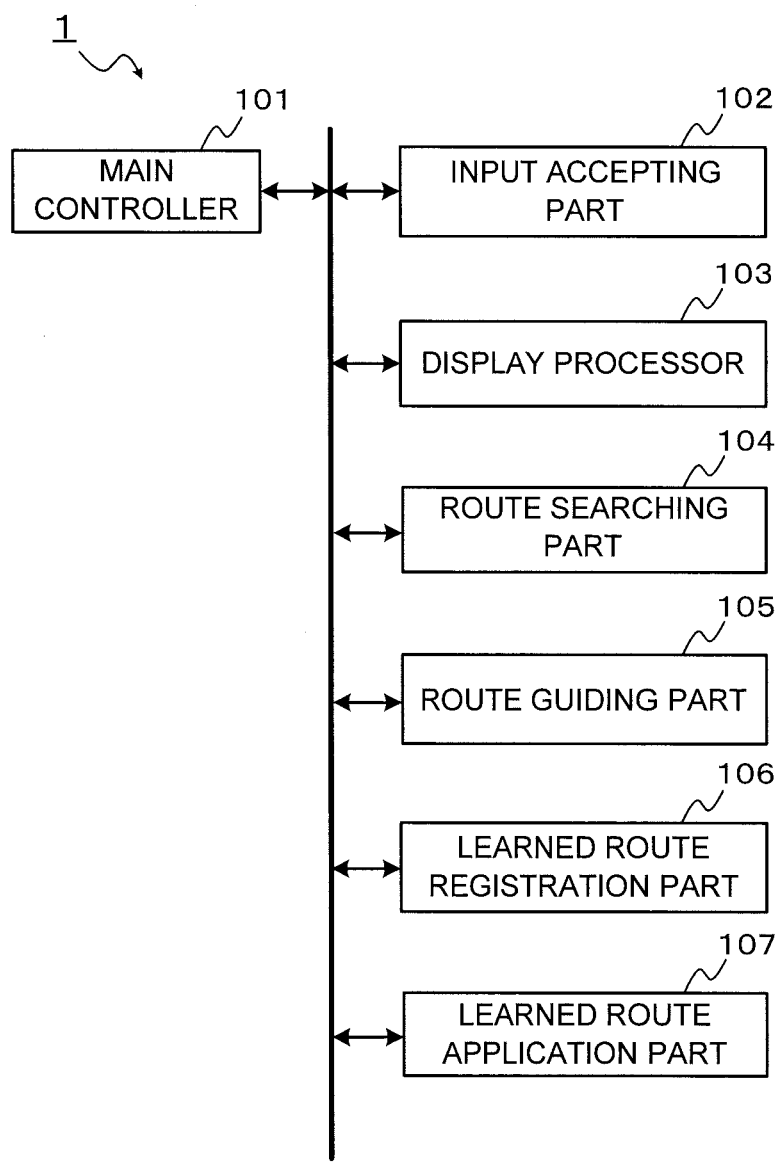
FIG. 4 is a functional block diagram of an arithmetic processing unit.

FIG. 4 is a functional block diagram of the arithmetic processing unit 1. As illustrated, the arithmetic processing unit 1 includes a main controller 101, an input accepting part 102, a display processor 103, a route searching part 104, a route guiding part 105, a learned route registration part 106, and a learned route application part 107.

The main controller 101 performs processing for overall control of each of the parts in the arithmetic processing unit 1.

The input accepting part 102 accepts a request from the user inputted in the input unit 5, and analyzes descriptions of the request. The input accepting part 102 notifies the main controller 101 of data based on a result of the analysis. For example, the input accepting part 102 accepts a request for power-on or power-off of the navigation system 100, or the like, and notifies the main controller 101 of the request. The input accepting part 102 further accepts input data regarding settings of various functions (e.g., setting of a search condition), the functions being held by the navigation system 100, and notifies the main controller 101 of the input data.

The display processor 103 displays on the display 2, a map, a recommended route being retrieved, a learned route, various messages given to the user, and the like. Specifically, the display processor 103 generates a drawing command to make a display on the display 2 and gives a notice thereof. It is to be noted that, upon displaying the map on the display 2, the display processor 103 extracts from the storage unit 3, the map data of the area requested to be displayed (for example, an area necessary for displaying the entire recommended route), and generates a map drawing command in a designated drawing format, so as to depict roads, other map structural objects, the current position, the destination, the recommended route, the learned route, and the like. The display processor 103 further displays a vehicle mark indicating the position of the vehicle, and various setting screens, on the map being displayed on the display 2.

The route searching part 104 performs a process for searching for a recommended route (route searching process). Specifically, the route searching part 104 makes settings such as the departure place, destination, and search condition. Then, the route searching part 104 retrieves a route which minimizes cost of the route (e.g., total distance and total travel time) connecting designated two points (the departure place and the destination), by using Dijkstra's Algorithm or the like, based on the search condition being set. On this occasion, the route searching part 104 stores in the memory such as the RAM 22, the identification code (link ID) 321 of each link that constitutes the recommended route being retrieved, establishing associations between the link IDs and the links respectively.

The route guiding part 105 performs route guidance along with the recommended route retrieved by the route searching part 104. In some cases, the learned route application part 107 may apply a learned route to the recommended route that is retrieved by the route searching part 104 (replace a partial section of the recommended route with the learned route). Details of this processing will be described later. On this occasion, the route guiding part 105 performs route guidance by using the recommended route after the learned route is applied.

Specifically, the route guiding part 105 displays (highlights), via the display processor 103, the recommended route included in the range of the map displayed on the display 2. At this timing, the route guiding part 105 displays on the recommended route, a moving object mark (car mark) that represents the current position of the moving object (vehicle). Furthermore, the route guiding part 105 compares the information of the recommended route with the current position, and displays on the display 2, whether or not the vehicle is supposed to go straight or turn to the left or to the right, prior to passing through a major crossing point or the like, together with an audio notice to the user by using the speaker 42 of the audio input and output unit 4.

The learned route registration part 106 performs processing for registering information regarding the learned route (learned route registration process).

Specifically, the learned route registration part 106 stores the link ID 321 constituting the route deviating from the recommended route (learned route) in the learned route information 400. By way of example, the learned route registration part 106 stores the link IDs 321, from the link on the point deviating from the recommended route to the link on the point returning to the recommended route, according to the order of traveling sequence.

The learned route registration part 106 stores in the learned route information 400, a result of actual traveling along the learned route. By way of example, if the traveled route with deviation from the recommended route is already stored in the learned route information 400, the learned route registration part 106 increments the number of traveling times 413 which is associated with the route (learned route). It is to be noted here that if the traveled route is already stored in the learned route information 400, though not deviating from the recommended route, the learned route registration part 106 may increment the number of traveling times 413 which is associated with the route (learned route). Furthermore, even though the recommended route is not set, the incrementing process as described above may be performed.

The learned route registration part 106 further stores the type information 414 of the learned route. Here, the type information 414 includes "toll road", "ordinary road", and "narrow road", and the like.

The learned route application part 107 performs a process for applying the learned route (learned route application process) to the recommended route retrieved by the route searching part 104. Specifically, the learned route application part 107 extracts from the learned route information 400, a learned route applicable to the recommended route being retrieved by the route searching part 104. Here, the learned route being extracted has the type information 414 which meets the search condition of the recommended route. Then, the learned route application part 107 replace a partial section of the recommended route with the extracted learned route. Details of the learned route application process will be described later.

It is to be noted that the constitutional elements described above are categorized according to the processing descriptions, so as to facilitate understanding of the configuration of the navigation system 100. Categorizing method of the constitutional elements or the names thereof may not restrict the scope of the present invention. The configuration of the navigation system 100 may be categorized into more various constitutional elements according to processing descriptions. It is alternatively possible to categorize the elements in such a manner that one constitutional element executes more various processing.

It is further possible that each of the functional parts is established by using hardware (ASIC, or the like). A piece of hardware may execute the processing of each of the functional parts, or multiple pieces of hardware may execute the same.

Next, an explanation will be made as to a characteristic behavior of the navigation system 100 having the configuration as described above.

<Learned Route Registration Process>

Figure 5:
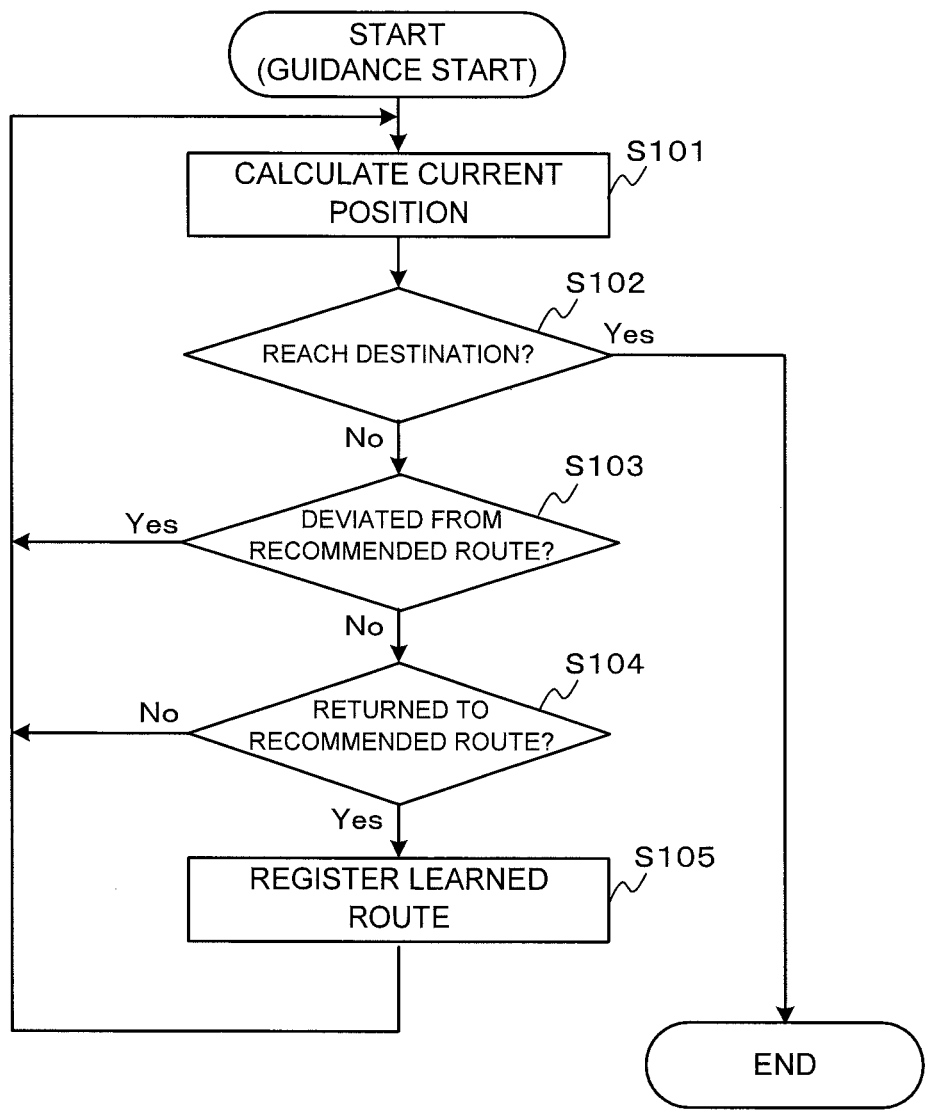
FIG. 5 is a flow chart showing a learned route registration process.

FIG. 5 is a flowchart showing the learned route registration process performed by the navigation system 100.

The learned route registration part 106 of the arithmetic processing unit 1 starts the learned route registration process at the timing when the route guiding part 105 starts the route guidance.

Upon starting the learned route registration process, the route guiding part 105 calculates the current position of the moving object (vehicle) (step S101). By way of example, the route guiding part 105 calculates the current position of the moving object by using the vehicle speed data outputted by the vehicle speed sensor 6, angular velocity data detected by the gyro sensor 7, and the like. In addition, the route guiding part 105 modifies the current position by using the output data from the GPS receiver 8.

Then, the route guiding part 105 determines whether or not the moving object has reached the destination (step S102). By way of example, the route guiding part 105 compares the current position calculated in the step S101, with the position set as the destination of the recommended route. When the current position coincides (approximately coincides) with the destination, it is determined that the moving object has reached the destination. On the other hand, if the current position does not coincide with the destination, it is determined that the moving object has not reached the destination yet.

Upon determining that the moving object has reached the destination (step S102; Yes), the route guiding part 105 terminates the route guidance. Accordingly, the learned route registration part 106 terminates the present flow (learned route registration process).

On the other hand, upon determining that the moving object has not reached the destination yet, the route guiding part 105 shifts the processing to the step S103.

When the processing shifts to the step S103, the route guiding part 105 determines whether or not the moving object deviates from the recommended route (step S103). By way of example, the route guiding part 105 compares the current position calculated in the step S101, with the recommended route. Then, if the current position does not exist on the recommended route, it is determined that the moving object has deviated from the recommended route. On the other hand, if the current position exists on the recommended route, it is determined that the moving object has not deviated from the recommended route.

When it is determined that the moving object has deviated from the recommended route (step S103; Yes), the route guiding part 105 specifies from the map data 310, a link where the moving object is traveling, based on the current position calculated in the step S101. Then, the route guiding part 105 temporarily stores the link ID 321 of the link being specified, as a candidate of the learned route, in the memory such as the RAM 22. Thereafter, the route guiding part 105 returns the processing to the step S101. Therefore, the processes from the step S101 to the step S103 are repeatedly executed while the moving object is traveling with a deviation from the recommended route, thereby accumulating the link IDs 321 serving as the learned route candidate.

On the other hand, upon determining that the moving object has not deviated from the recommended route (step S103; No), the route guiding part 105 shifts the processing to the step S104.

When the processing is shifted to the step S104, the route guiding part 105 determines whether or not the moving object has returned to the recommended route (step S104). In other words, it is determined whether or not the moving object has returned from the route that is not the recommended route.

Specifically, the route guiding part 105 compares the current position calculated in the step S101 just before, with the current position calculated in the step S101 two times ago. Then, it is determined that the moving object has returned to the recommended route in the case where the current position calculated in the step S101 two times ago does not exist on the recommended route, and the current position calculated in the step S101 just before exists on the recommended route. On the other hand, if both the current position calculated in the step S101 two times ago and the current position calculated in the step S101 just before exist on the recommended route, it is determined that an action taken by the moving object is not a return to the recommended route. It is to be noted that if the current position calculated in the step S101 two times ago does not exist, it is also determined that the action taken by the moving object is not a return to the recommended route.

If it is determined that the moving object has returned to the recommended route (step S104; Yes), the route guiding part 105 shifts the processing to the step S105.

On the other hand, if it is determined that the action taken by the moving object is not a return to the recommended route (it keeps on traveling along the recommended route), the route guiding part 105 returns the processing to the step S101. Therefore, while the moving object keeps on traveling on the recommended route, the route guiding part 105 repeatedly executes the processes from the step S101 to the step 3104.

When the processing is shifted to the step S105, the learned route registration part 106 registers as a learned route, the route the moving object has traveled with deviation from the recommended route (step S105).

Specifically, the learned route registration part 106 firstly reads the link ID 321 serving as a candidate of the learned route that is stored in the memory in the step S103. Then, it is checked whether or not the learned route candidate being read out is the learned route that is already registered in the learned route information 400.

Here, in the case where the learned route candidate is already registered, the learned route registration part 106 increments the number of traveling times 413 being associated with the learned route ID 411 of the learned route (in other words, modify the value to be incremented by "1").

On the other hand, if the candidate of the learned route has not been registered yet, the learned route registration part 106 adds the candidate as the learned route, to the learned route information 400.

Byway of example, the learned route registration part 106 adds a record 415 to the learned route information 400, and stores the learned route ID 411, the link ID 412 of the link constituting the learned route, the number of traveling times 413, and the type information 414, in such a manner as establishing associations with one another.

Here, as for the link ID 412 of the link constituting the learned route, the link IDs 321 accumulated in the memory in the step S103 are stored in the order of traveling sequence. In addition, data indicating "one time" is stored as the number of traveling times 413. It is further possible that as for the link ID 412 of a deviation point, the learned route registration part 106 may store the link ID in association with the coordinates of the deviation point. Similarly, as for the link ID 412 of the returning point, it is also possible that the link ID is stored in association with the coordinates of the returning point.

The type information 414 stores data indicating the "toll road", "ordinary road", "narrow road, and the like. Here, the type information 414 is determined by using the road type 323 which is associated with the link ID 321. Specifically, in the case where at least one toll road is included in the links constituting the learned route, the learned route registration part 106 stores the learned route as the "toll road". If the links constituting the learned route include neither the toll road nor the narrow road, the learned route is stored as the "ordinary road". In addition, in the other case (that is, the links constituting the learned route do not include the toll road but include at least one narrow road), the learned route is stored as the "narrow road".

Registration of the learned route in the step S105 is performed every time when the moving object returns to the recommended route. Therefore, even though the traveling deviates from the recommended route more than once, between the departure place and the destination, it is possible to register each learned route in the learned route information 400.

After the learned route is registered, the learned route registration part 106 returns the process to the step S101.

<Route Searching Process>

Figure 6:
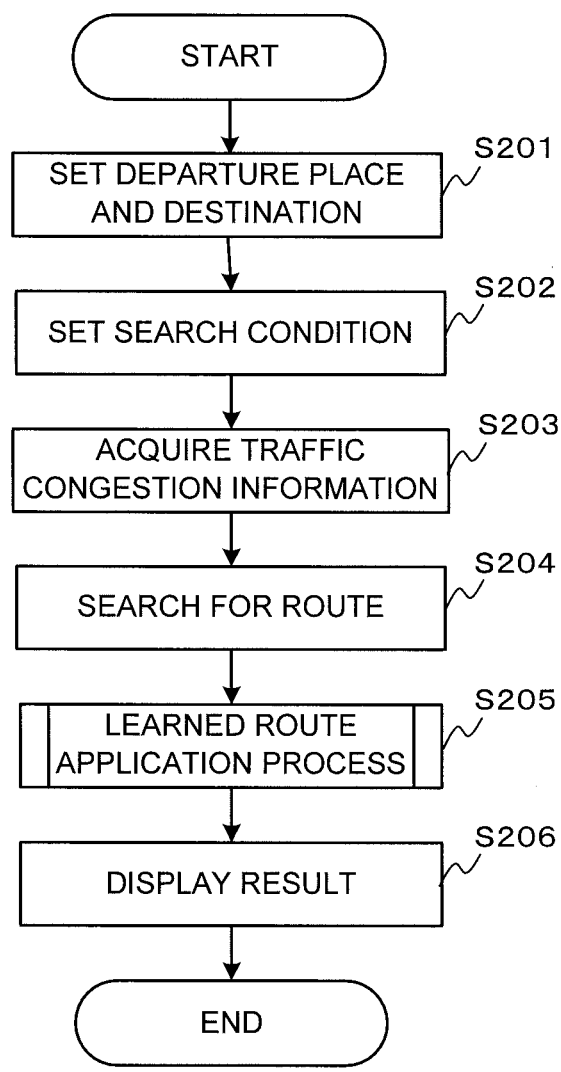
FIG. 6 is a flow chart showing a route searching process.

FIG. 6 is a flowchart showing the route searching process executed by the navigation system 100.

The route searching part 104 of the arithmetic processing unit 1 starts the route searching process based on a directive from a user, for instance.

Upon starting the route searching process, the route searching part 104 sets a departure place and a destination (step S201). For example, the route searching part 104 displays a predetermined setting screen and accepts from the user, a designation of the departure place and the destination.

Next, the route searching part 104 sets a search condition of a recommended route (step S202). By way of example, the route searching part 104 displays a predetermined setting screen, and accepts an input of the search condition from the user.

Here, a settable search condition includes, for instance, "the first toll road priority" for making a search putting a priority on a toll road, "the second toll road priority" for making a search for a route different from the recommended route being retrieved based on the search condition of "the first toll road priority", "the third toll road priority" for making a search putting a priority on the toll road in consideration of a toll fee, "the first ordinary road priority" for making a search putting a priority on an ordinary road, "the second ordinary road priority" for making a search putting a priority on a wide road and searching for a road different from the recommended road being retrieved based on "the first ordinary road priority", "distance priority" for making a search so that a distance from the departure place to the destination becomes the shortest, and the like.

Next, the route searching part 104 acquires traffic congestion information (step S203). Specifically, with the use of the FM multiple broadcasting receiver 9, the beacon receiver 10, and the like, the route searching part 104 acquires traffic congestion information (including restriction information, and the like) in an area being the route searching target (e.g., the area including a route from the departure place to the destination).

Subsequently, the route searching part 104 performs the route searching process (step S204). Specifically, the route searching part 104 searches for a recommended route from the departure place to the destination set in the step S201, based on the search condition set in the step S202.

By way of example, in the case where "the first toll road priority" is set as the search condition, the route searching part 104 searches for a recommended route, by using the link (link ID 321) having the road type 323, i.e., "toll road", "ordinary road", or "narrow road".

In the case where "the second toll road priority" is set as the search condition, the route searching part 104 searches for a recommended route, by using the link having the road type 323, i.e., "toll road", "ordinary road", or "narrow road". It is to be noted that even though a link has the road type 323 of "toll road", the link that is used in the recommended road being retrieved based on "the first toll road priority" is excluded. In other words, the toll road used in the recommended route being retrieved based on the search condition of "the second toll road priority" is at least different from the toll road used in the recommended route being retrieved based on the search condition of "the first toll road priority".

In the case where "the third toll road priority" is set as the search condition, the route searching part 104 searches for a recommended route, by using the link having the road type 323, i.e., "toll road", "ordinary road", or "narrow road". It is to be noted that a link having the road type 323 of a low toll fee (e.g., the lowest fee) is prioritized, out of the links having the road type 323 of "toll road".

In the case where "the first ordinary road priority" is set as the search condition, the route searching part 104 uses a link having the road type 323 of "ordinary road" or "narrow road", to search for a recommended route.

In the case where "the second ordinary road priority" is set as the search condition, the route searching part 104 uses a link having the road type 323 of "ordinary road" to search for a recommended route. It is to be noted that even though the link has the road type 323 of "ordinary road", the link used for the recommended route that is retrieved based on the search condition of "the first ordinary road priority" is excluded. Then, among the links that are not excluded, a link having the road type 323 of wide road width (e.g., the widest road) is prioritized.

In the case where "distance priority" is set as the search condition, the route searching part 104 uses a link having the road type 323 of "toll road" or "ordinary road" to search for a recommended route. It is to be noted that a link with a total distance from the departure place to the destination being the shortest (e.g., the shortest distance) is used, out of the links having the road type 323 of "toll road" or "ordinary road".

In the case where "the first toll road priority", "the second toll road priority", "the third toll road priority", or "the first ordinary road priority" is set out of the search conditions described above, the route search is performed in consideration of traffic congestion information. Specifically, the route searching part 104 reads the traffic congestion information acquired in the step S203, and as for the link being congested, it is excluded from the target for a recommended route search, or relegated in a lower priority. On the other hand, if "the second ordinary road priority" is set, out of the search conditions described above, the recommended route is retrieved putting the highest priority on the road width, and the traffic congestion information is not considered. Similarly, if the "distance priority" is set, the recommended route is retrieved putting the highest priority on the distance from the departure place to the destination, and the traffic congestion information is not considered.

After searching for a recommended route based on the search condition as described above, the route searching part 104 stores in the memory such as the RAM 22, the links ID 321 of the respective links that constitute the recommended route being retrieved.

Next, the learned route application part 107 performs the learned route application process (step S205). In other words, the learned route application part 107 selects the learned route having the type information 414 that meets the search condition, and performs a process to apply the learned route to the recommended route retrieved in the step S204 (to replace the recommended route with the learned route). Details of the learned route application process will be described later.

Then, the route guiding part 105 displays on the display 2, a result obtained in the step S205 (a recommended route after the learned route is applied, and the like) (step S206).

FIG. 7(A) illustrates a display example where a recommended route is displayed after the learned route is applied, together with the recommended route retrieved based on the search condition. As illustrated, if the search condition of the recommended route is "the first ordinary road priority", a learned route having the type information 414 being "ordinary road" (or "narrow road") is selected and displayed. In other words, the learned route is displayed having the type information 414 that meets the search condition. The route guiding part 105 highlights the section of the learned route (dotted line), in such a manner as displaying with a color different from other routes, or the like.

On the other hand, if any of the learned routes having the type information that meets the search condition is not applicable, it is not possible to display the recommended route as shown in FIG. 7(A).

FIG. 7(B) illustrates a display example in the case where the learned route having the type information that meets the search condition is not applicable. As illustrated, there is a possibility that the learned route including a toll road is displayed, even though the search condition of the recommended route is "the first ordinary road priority". With this result, it cannot be said that the recommended route necessary for the user is displayed.

Referring to FIG. 6 again, the route searching part 104 terminates this flow after the process in the step S206.

Next, details of the learned route application process (step S205) will be explained.

<Learned Route Application Process>

Figure 8:
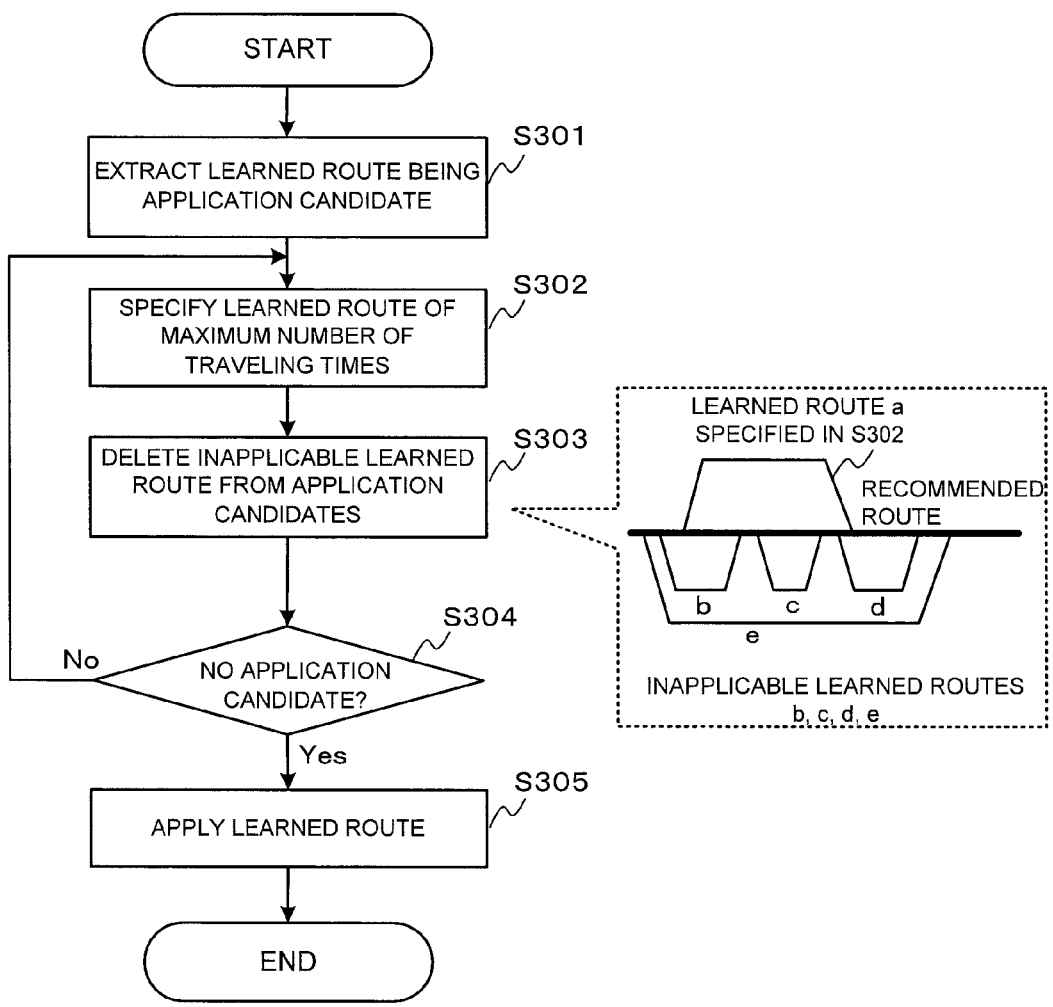
FIG. 8 is a flow chart showing a learned route application process.

FIG. 8 is a flowchart showing the learned route application process performed by the navigation system 100.

When the processing shifts to the step S205, the learned route application part 107 of the arithmetic processing unit 1 extracts a learned route serving as an application candidate from the learned route information 400 (step S301). Specifically, the learned route application part 107 extracts from the learned route information 400, the learned route having the type information 414 that meets the search condition set in the step S202. It is to be noted that the learned route having neither a deviation point nor a returning point on the recommended route retrieved in the step S204 is not extracted. Therefore, the learned route application part 107 extracts from the learned route information 400, the learned route having the type information 414 that meets the search condition, out of the learned route (record 415) included in the links constituting the recommended route where a link having the deviation point and a link having the returning point are included.

FIG. 9 illustrates an example of associations between the search condition and the type information 414 of the learned route.

As illustrated, when "the first toll road priority" is set as the search condition, the learned route application part 107 extracts the learned route having the type information 414 of "toll road", "ordinary road", or "narrow road".

In the case where "the second toll road priority" is set as the search condition, the learned route application part 107 extracts the learned route having the type information 414 of "toll road", "ordinary road", or "narrow road". It is to be noted that even though the learned road has the type information 414 of "toll road", the learned road which has been applied to the recommended route retrieved based on the search condition of "the first toll road priority", is excluded. With this exclusion, it is not possible to extract a learned route identical to the learned route that has been applied to the recommended route being retrieved based on the search condition of "the first toll road priority". Even though the learned route has the type information 414 of "ordinary road", this learned route is not extracted if the section (on the recommended route) of the target for application (replacement target) is "toll road". In other words, the learned route being the ordinary road cannot substitute for the section of toll road.

In the case where "the third toll road priority" is set as the search condition, the learned route application part 107 extracts the learned route having the type information 414 of "ordinary road" or "narrow road". Even though the learned route has the type information 414 of "ordinary road", this learned route is not extracted, if the section (on the recommended route) of the target for application (replacement target) is a "toll road". In other words, the learned route being the ordinary road cannot substitute for the section of toll road. It is to be noted that the reason why the learned route having the type information 414 of "toll road" is not extracted here is that the recommended route retrieved in the step S204 is selected putting priority on the toll road (link) of low fee. If the recommended route is replaced by other toll road (learned route), the toll fee may not be low any more.

If "the first ordinary road priority" is set as the search condition, the learned route application part 107 extracts a learned route having the type information 414 of "ordinary road" or "narrow road".

In the case where "the second ordinary road priority" is set as the search condition, the learned route application part 107 extracts a learned route having the type information 414 of "ordinary road". It is to be noted that even though the learned road has the type information 414 of "ordinary road", the learned road which has been applied to the recommended route retrieved based on the search condition of "the first ordinary road priority", is excluded. With this exclusion, it is not possible to extract a learned route identical to the learned route that has been applied to the recommended route being retrieved based on the search condition of "the first ordinary road priority". It is to be noted that the reason why the learned route having the type information 414 of "narrow road" is not extracted here is that the recommended route retrieved in the step S204 is selected putting priority on a wide road (link). If the recommended route is replaced by a learned road being "narrow road", the recommended route may not be a wide road any more.

In the case where "distance priority" is set as the search condition, the learned route application part 107 does not extract any of the learned routes. This is because the recommended route retrieved in the step S204 is selected putting priority on the road (link) which makes the distance from the departure place to the destination to be short (e.g., the shortest distance). If the recommended route is replaced by the learned route, the recommended route may not be assumed as a short distance to reach the destination.

As thus described, the learned route application part 107 extracts as a learned route of application candidate, a learned route (record 415) with the type information 414 that meets the search condition. It is a matter of course that if there is more than one learned route having the type information 414 that meets the search condition, the learned route application part 107 extracts those multiple learned routes. Then, the learned route application part 107 stores those extracted learned routes in the memory such as the RAM 22.

Referring to FIG. 8 again, the learned route application part 107 selects one learned route out of the learned routes extracted in the step S301, based on the priority (e.g., the number of traveling times) (step S302). By way of example, the learned route application part 107 specifies one learned route as a learned route as an application candidate, which is associated with the record 415 having the maximum number of traveling times 413.

Then, the learned route application part 107 deletes from the learned routes extracted in the step S301, any learned route that is not applicable (step S303). Specifically, the learned route application part 107 deletes the learned route which is not applicable to an identical recommended route simultaneously with the learned route specified in the step S302. In other words, the learned route application part 107 deletes the learned routes (b, c, and d) that include at least either one of the deviation point and the returning point, between the deviation point and the returning point of the learned route a, which is specified in the step S302. In addition, the learned route e is also deleted, which includes between its deviation point and returning point, both the deviation point and the returning point of the learned route a specified in the step S302. Here, the start node 322 of the link on the deviation point, coordinates of the deviation point, and the like, are used for specifying the deviation point. For specifying the returning point, the end node 322 of the link on the returning point, coordinates of the returning point, and the like, are used.

Subsequently, the learned route application part 107 determines whether or not any other learned route exists which serves as the application candidate (step S304). Specifically, the learned route application part 107 checks whether or not any remaining learned route exists, after excluding the learned route that is specified in the step S302 and the learned route deleted in the step S303, from the learned routes extracted in the step S301. If there is any learned route still remaining, it is determined that other learned route exists which serves as the application candidate. On the other hand, if there is no learned route still remaining, it is determined that no other learned route exists which serves as the application candidate.

If it is determined that any other learned route exists which serves as the application candidate (step S304; Yes), the learned route application part 107 returns the process to the step S302. Then, the learned route application part 107 repeatedly executes the processes from the step S302 to the step S304, until the time when there is no other learned route serving as the application candidate. Accordingly, it is possible to apply multiple applicable learned routes, to one recommended route retrieved in the step S204.

On the other hand, when it is determined that there is no other learned route serving as the application candidate (step S304; No), the learned route application part 107 shifts the process to the step S305.

The learned route application part 107 applies the learned route specified in the step S302 to the recommended route retrieved in the step S204 (step S305). Specifically, the learned route application part 107 replaces a part of the recommended route retrieved in the step S204 with the learned route specified in the step S302. Then, the learned route application part 107 stores the recommended route (the link ID 321 constituting the recommended route) after the replacement is performed, in the memory such as the RAM 22.

Thereafter, the learned route application part 107 terminates the flow and shifts the process to the step S206.

It is to be noted that the processing units of the aforementioned flow are categorized according to major processing details, to facilitate understanding of the processes in the navigation system 100. Categorizing method of the processing steps or the names thereof may not restrict the scope of the present invention. The processes performed by the navigation system 100 may be further divided into more processing steps. Alternatively, one processing step may execute more processes.

The embodiment of the present invention in the foregoing description is intended to be illustrative, rather than limiting, of the spirit and scope of the invention. Therefore, those skilled in the art will readily appreciate many alternatives, modifications, and variations thereof.

By way of example, in the present embodiment, the route searching part 104 searches for one recommended route which serves as a candidate. However, the present invention is not limited to this example. The route searching part 104 may search for multiple recommended routes (so called, "multiple route searching").

When the multiple route searching is performed, the route searching part 104 searches for multiple recommended routes in the step S204, the recommended routes satisfying the search condition set in the step S202.

For example, the route searching part 104 searches for a first recommended route satisfying the search condition of "the first toll road priority", and searches for a second recommended route satisfying the search condition of "the second toll road priority".

FIG. 10(A) illustrates a display example of two recommended routes being retrieved based on two search conditions, represented by solid lines. As illustrated, the first recommended route satisfying the search condition of "the first toll road priority" and the second recommended route satisfying the search condition of "the second toll road priority" are displayed respectively.

Then, the learned route application part 107 subjects each of the recommended routes retrieved in the step S204 to the process in the step S205 (processes from the step S301 to the step S305). Accordingly, the learned route application part 107 applies the learned route with the type information 414 that meets the search condition, with respect to each recommended route.

Therefore, the learned route application part 107 is allowed to apply the learned routes different from each other (the first learned route and the second learned route) to the respective recommended routes as illustrated in FIG. 10(A).

Similar to the case of displaying one learned route, the route guiding part 105 highlights the multiple learned routes (dotted lines), in such a manner as displaying with a color different from other routes. With this configuration, the user is allowed to easily select which recommended route to take, so as to travel up to the destination.

On the other hand, if the learned route having the type information that meets the search condition is not applicable, the recommended route as shown in FIG. 10(A) cannot be displayed.

FIG. 10(B) illustrates a display example in the case where any learned route with the type information that meets the search condition is not applicable. As illustrated, there is a possibility that an identical learned route is applied to each of the recommended routes (the first recommended route and the second recommended route). Consequently, there is only one learned route that can be displayed. It may result in that the multiple route searching becomes meaningless.

It is further possible configure in such a manner that even though multiple route searching is not performed, multiple recommended routes are retrieved. On this occasion, when the search condition of "the first toll road priority" is set, a second recommended route satisfying "the second toll road priority" is retrieved without accepting the setting from the user. Similarly, when the search condition of "the first ordinary road priority" is set, a second recommended route satisfying "the second ordinary road priority" is retrieved without accepting the setting from the user.

EXPLANATION OF REFERENCES

1 . . . ARITHMETIC PROCESSING UNIT, 2 . . . DISPLAY, 3 . . . STORAGE UNIT, 4 . . . AUDIO INPUT AND OUTPUT UNIT, 5 . . . INPUT UNIT, 6 . . . VEHICLE SPEED SENSOR, 7 . . . GYRO SENSOR, 8 . . . GPS RECEIVER, 9 . . . FM MULTIPLEX BROADCASTING RECEIVER, 10 . . . BEACON RECEIVER, 21 . . . CPU,

22 . . . RAM, 23 . . . ROM, 24 . . . INTERFACE (I/F), 41 . . . MICROPHONE, 42 . . . SPEAKER, 51 . . . TOUCH PANEL, 52 . . . DIAL SWITCH, 100 . . . NAVIGATION SYSTEM, 101 . . . MAIN CONTROLLER, 102 . . . INPUT ACCEPTING PART, 103 . . . DISPLAY PROCESSOR, 104 . . . ROUTE SEARCHING PART, 105 . . . ROUTE GUIDING PART, 106 . . . LEARNED ROUTE REGISTRATION PART, 107 . . . LEARNED ROUTE APPLICATION PART, 310 . . . MAP DATA, 311 . . . MESH ID, 320 . . . LINK DATA, 321 . . . LINK ID, 322 . . . START NODE, END NODE, 323 . . . ROAD TYPE, 324 . . . LINK LENGTH, 325 . . . LINK TRAVEL TIME, 326 . . . START CONNECTION LINK, END CONNECTION LINK, 400 . . . LEARNED ROUTE INFORMATION, 411 . . . LEARNED ROUTE ID, 412 . . . LINK ID, 413 . . . THE NUMBER OF TRAVELING TIMES, 414 . . . TYPE INFORMATION, 415 . . . RECORD

What is claimed is:

1. A route search device, comprising:
a storage unit adapted to store, as a learned route, a route of a section through which travelling is performed with deviation from a recommended route;
a setting unit adapted to set a search condition of the recommended route;
a recommended route searching unit adapted to search for the recommended route based on the search condition;
an application unit adapted to select, from the storage unit, a learned route applicable to the recommended route being retrieved and adapted to apply the learned route to the recommended route; and
a display unit adapted to display the recommended route to which the learned route is applied;
wherein the storage unit stores type information regarding a road type of the learned route, together with the learned route; and
wherein the application unit selects, from the storage unit, a learned route having the type information that meets the search condition.

2. The route search device according to claim 1, wherein:
the storage unit stores the learned route, the type information, and a priority order of the learned route, being associated with one another; and
the application unit selects, from the storage unit, the learned route according to the priority order, out of the learned route having the type information that meets the search condition.

3. The route search device according to either of claim 1 and claim 2, wherein:
the setting unit sets as the search condition either of: (a) a first condition for searching for the recommended route putting a priority on a toll road; and (b) a second condition for searching for the recommended route putting a priority on an ordinary road;
the storage unit stores, as the type information, information items indicating at least the toll road and the ordinary road; and
the application unit selects, from the storage unit, the learned route having either of the type information of the toll road and the type information of the ordinary road, upon the setting of the first condition as the search condition, and the application unit selects from the storage unit the learned route having the type information of the ordinary road, upon the setting of the second condition as the search condition.

4. The route search device according to claim 3, wherein:
the storage unit stores, as the type information, information items indicating at least any of the toll road, the ordinary road, and a narrow road;
the application unit selects, from the storage unit, when the first condition is set as the search condition, the learned route having the type information of any of the toll road, the ordinary road, and the narrow road, the application unit determines a first recommended route by applying the leaned route to the recommended route being retrieved in the recommended route searching unit, the application unit further selects, from the storage unit, the learned route that has not been applied to the first recommended route, out of the learned route having the type information of any of the toll road, the ordinary road, and the narrow road, and the application unit determines a second recommended route by applying the learned route to the recommended route;
the application unit selects, from the storage unit, when the second condition is set as the search condition, the learned route having the type information of either of the ordinary road and the narrow road, the application unit determines a third recommended route by applying the leaned route to the recommended route being retrieved in the recommended route searching unit, the application unit further selects, from the storage unit, the learned route that has not been applied to the third recommended route, out of the learned route having the type information of the ordinary road, and the application unit determines a fourth recommended route by applying the learned route to the recommended route; and
the display unit displays, when the first condition is set as the search condition, the second recommended route together with the first recommended route, and when the second condition is set as the search condition, the fourth recommended route together with the third recommended route.

5. A route search method implemented by use of a processor, the method comprising:
a storing step using the processor for storing in a storage medium, as a learned route, a route of a section through which travelling is performed with deviation from a recommended route;
a setting step using the processor for setting a search condition of the recommended route;
a recommended route searching step using the processor for searching for the recommended route based on the search condition;
an application step using the processor for selecting, from the storage medium, a learned route applicable to the recommended route being retrieved and for applying the learned route to the recommended route; and
a displaying step using the processor for displaying the recommended route to which the learned route is applied;
wherein the storing step stores type information regarding a road type of the learned route, together with the learned route, and
wherein the application step selects, from the storage medium, a learned route having the type information that meets the search condition.

6. The route search method according to claim 5, wherein:
the storing step stores the learned route, the type information, and a priority order of the learned route, being associated with one another; and the application step selects, from the storage medium, the learned route according to the priority order, out of the learned route having the type information that meets the search condition.

7. The route search method according to claim 5, wherein:
the setting step sets as the search condition either of: (a) a first condition for searching for the recommended route putting a priority on a toll road; and (b) a second condition for searching for the recommended route putting a priority on an ordinary road;
the storage medium stores, as the type information, information items indicating at least the toll road and the ordinary road; and
the application step selects, from the storage medium, the learned route having either of the type information of the toll road and the type information of the ordinary road, upon the setting of the first condition as the search condition, and the application step selects, from the storage medium, the learned route having the type information of the ordinary road, upon the setting of the second condition as the search condition.

8. The route search method according to claim 7, wherein:
the storage step stores, as the type information, information items indicating at least any of the toll road, the ordinary road, and a narrow road;
the application step selects, from the storage medium, when the first condition is set as the search condition, the learned route having the type information of any of the toll road, the ordinary road, and the narrow road, the application step determines a first recommended route by applying the leaned route to the recommended route being retrieved in the recommended route searching step, the application step further selects, from the storage medium, the learned route that has not been applied to the first recommended route, out of the learned route having the type information of any of the toll road, the ordinary road, and the narrow road, and the application step determines a second recommended route by applying the learned route to the recommended route;
the application step selects, from the storage medium, when the second condition is set as the search condition, the learned route having the type information of either of the ordinary road and the narrow road, the application step determines a third recommended route by applying the leaned route to the recommended route being retrieved in the recommended route searching step, the application step further selects, from the storage medium, the learned route that has not been applied to the third recommended route, out of the learned route having the type information of the ordinary road, and the application step determines a fourth recommended route by applying the learned route to the recommended route; and
the display step displays, when the first condition is set as the search condition, the second recommended route together with the first recommended route, and when the second condition is set as the search condition, the fourth recommended route together with the third recommended route.

\* \* \* \* \*